US012570218B2

(12) United States Patent
Salter et al.

(10) Patent No.: US 12,570,218 B2
(45) Date of Patent: Mar. 10, 2026

(54) TRACK ASSEMBLY WITH STORAGE BIN

(71) Applicant: Ford Global Technologies, LLC, Dearborn, MI (US)

(72) Inventors: Stuart C. Salter, White Lake, MI (US); Blaise Nugent, Brighton, MI (US); Matthew B. Rutman, Westland, MI (US); Brendan Diamond, Naples, FL (US)

(73) Assignee: Ford Global Technologies, LLC, Dearborn, MI (US)

( * ) Notice: Subject to any disclaimer, the term of this patent is extended or adjusted under 35 U.S.C. 154(b) by 45 days.

(21) Appl. No.: 18/676,847

(22) Filed: May 29, 2024

(65) Prior Publication Data

US 2025/0368145 A1 Dec. 4, 2025

(51) Int. Cl.
B60R 9/06 (2006.01)

(52) U.S. Cl.
CPC ..................................... B60R 9/06 (2013.01)

(58) Field of Classification Search
CPC .. B60R 9/00; B60R 5/04; B60R 11/06; B60R 13/01; B60P 1/003; B62D 33/08; B62D 33/0273
See application file for complete search history.

(56) References Cited

U.S. PATENT DOCUMENTS

| | | | |
|---|---|---|---|
| 4,506,870 A | | 3/1985 | Penn |
| 4,789,195 A | * | 12/1988 | Fletcher .................. B60R 11/06 |
| | | | 224/543 |
| 4,938,398 A | | 7/1990 | Hallsen |
| 5,848,818 A | * | 12/1998 | Flueckinger .............. B60R 9/00 |
| | | | 296/37.6 |
| 6,082,804 A | | 7/2000 | Schlachter |
| 6,203,087 B1 | * | 3/2001 | Lance ..................... B60R 11/06 |
| | | | 224/403 |
| 6,254,162 B1 | | 7/2001 | Faber et al. |
| 6,648,569 B2 | | 11/2003 | Douglass et al. |
| 6,698,634 B2 | * | 3/2004 | Thomson ................ E04H 15/06 |
| | | | 224/404 |
| 7,240,942 B2 | | 7/2007 | Grafton |
| 7,942,295 B1 | * | 5/2011 | Hume ..................... B60R 11/06 |
| | | | 296/100.06 |
| 8,701,950 B2 | | 4/2014 | Roach et al. |
| 9,694,754 B2 | * | 7/2017 | Sterling ................... B60R 5/04 |
| 10,000,159 B2 | * | 6/2018 | Hellman .................. B60R 7/02 |
| 10,583,962 B2 | | 3/2020 | Brunner et al. |
| 10,703,534 B2 | | 7/2020 | Brunner et al. |
| D895,966 S | | 9/2020 | Brunner et al. |
| D895,967 S | | 9/2020 | Brunner et al. |
| D896,517 S | | 9/2020 | Brunner et al. |
| D896,518 S | | 9/2020 | Brunner et al. |
| D897,103 S | | 9/2020 | Brunner et al. |

(Continued)

OTHER PUBLICATIONS

US 10,947,009 B2, 03/2021, Brunner et al. (withdrawn)

*Primary Examiner* — Corey N Skurdal
(74) *Attorney, Agent, or Firm* — Vichit Chea; Carlson, Gaskey & Olds, P.C.

(57) ABSTRACT

A system and method include providing a track assembly that supports at least one accessory base plate in a vehicle cargo area, wherein the track assembly extends to a distal end that faces a tailgate. One or more receptacles are mounted within the distal end, and each receptacle is moveable between an open position and a closed position.

23 Claims, 4 Drawing Sheets

(56) References Cited

U.S. PATENT DOCUMENTS

| | | | |
|---|---|---|---|
| D898,320 S | 10/2020 | Brunner et al. | |
| 10,829,059 B1 * | 11/2020 | Addison | B60P 1/433 |
| 10,829,962 B2 | 11/2020 | Ruth et al. | |
| 10,962,218 B2 | 3/2021 | Plato et al. | |
| 10,981,696 B2 | 4/2021 | Brunner et al. | |
| D917,977 S | 5/2021 | Brunner et al. | |
| D918,584 S | 5/2021 | Brunner et al. | |
| D919,296 S | 5/2021 | Brunner et al. | |
| 11,008,136 B2 | 5/2021 | Brunner et al. | |
| D920,671 S | 6/2021 | Brunner et al. | |
| 11,027,883 B1 | 6/2021 | Brunner et al. | |
| D923,935 S | 7/2021 | Brunner et al. | |
| 11,192,690 B1 | 12/2021 | Brunner et al. | |
| 11,268,691 B2 | 3/2022 | Plato et al. | |
| 11,365,026 B2 | 6/2022 | Brunner et al. | |
| 11,427,382 B2 | 8/2022 | Brunner et al. | |
| 11,465,805 B2 | 10/2022 | Brunner et al. | |
| 2004/0118887 A1 | 6/2004 | Axelson | |
| 2005/0052045 A1 | 3/2005 | Juzwiak | |
| 2015/0102624 A1 | 4/2015 | Kmita et al. | |
| 2015/0375687 A1 | 12/2015 | Gillam et al. | |
| 2019/0225371 A1 | 7/2019 | Hoppe et al. | |
| 2020/0147781 A1 | 5/2020 | Squires et al. | |
| 2021/0139197 A1 | 5/2021 | Brunner et al. | |
| 2022/0099281 A1 | 3/2022 | Caccaibeve | |
| 2022/0135147 A1 | 5/2022 | Robinson et al. | |
| 2022/0186922 A1 | 6/2022 | Plato et al. | |
| 2022/0380089 A1 | 12/2022 | Brunner et al. | |
| 2022/0416359 A1 | 12/2022 | Feltham et al. | |
| 2023/0090819 A1 | 3/2023 | Brunner et al. | |
| 2023/0198088 A1 | 6/2023 | Yadav et al. | |
| 2023/0258325 A1 | 8/2023 | Plato et al. | |
| 2023/0268613 A1 | 8/2023 | Kullberg et al. | |
| 2023/0312173 A1 | 10/2023 | Brunner et al. | |
| 2023/0356787 A1 | 11/2023 | Salter et al. | |
| 2024/0051619 A1 * | 2/2024 | Rutman | B60P 1/003 |

* cited by examiner

TRACK ASSEMBLY WITH STORAGE BIN

TECHNICAL FIELD

This disclosure relates generally to a track assembly that supports an adjustable base plate used to secure accessories in a vehicle cargo space, and more particularly to one or more storage receptacles or bins that are incorporated into the track assembly.

BACKGROUND

Vehicles transport various types of cargo and accessories, such as bins, containers, and tools, for example. The accessories that need to be transported can vary based on the tasks the user performs at a work place or jobsite. Thus, some accessories may be removed from the vehicle while other accessories and items may remain stored within a vehicle cargo area.

SUMMARY

A system according to an exemplary aspect of the present disclosure includes, among other things: a first track structure configured to extend along one side of a vehicle cargo area; a second track structure configured to extend along an opposite side of a vehicle cargo area, wherein each of the first track structure and the second track structure extend to a distal end; at least one base plate having a first edge and a second edge opposite of the first edge, wherein the first edge is supportable by the first track structure and the second edge is supportable by the second track structure; and one or more receptacles mounted within at least one distal end of the first track structure and the second track structure, wherein the one or more receptacles are moveable between an open position and a closed position.

In some aspects, the techniques described herein relate to any of the described systems, and further including wherein the at least one base plate is mounted for sliding movement along the first track structure and the second track structure.

In some aspects, the techniques described herein relate to any of the described systems, and further including wherein the one or more receptacles comprise a plurality of receptacles, wherein at least one receptacle is mounted in each distal end of the first track structure and the second track structure.

In some aspects, the techniques described herein relate to any of the described systems, and further including wherein the at least one receptacle mounted in each distal end comprises at least two receptacles mounted in each distal end.

In some aspects, the techniques described herein relate to any of the described systems, and further including wherein a first receptacle of the at least two receptacles is positioned vertically above a second receptacle of the at least two receptacles.

In some aspects, the techniques described herein relate to any of the described systems, and further including wherein the one or more receptacles comprise a base wall with one or more side walls extending outwardly around an outer periphery of the base wall to form an internal cavity having an open end, and including a cover that closes the internal cavity.

In some aspects, the techniques described herein relate to any of the described systems, and further including wherein the cover is pivotal between the open position and the closed position.

In some aspects, the techniques described herein relate to any of the described systems, and further including wherein the distal end of the first track structure and the second track structure face an inner surface of a movable vehicle panel when the movable vehicle panel is in a closed position, and wherein the cover pivots to the open position in response to the movable vehicle panel moving to an open position.

In some aspects, the techniques described herein relate to any of the described systems, and further including wherein the cover automatically pivots to the closed position in response to the movable vehicle panel moving to the closed position, and wherein access to the one or more receptacles is prevented by moving the movable vehicle panel to the closed position.

In some aspects, the techniques described herein relate to any of the described systems, and further including wherein the distal end of each of the first track structure and the second track structure comprises an open pocket surrounded by one or more walls, and wherein the one or more receptacles are at least partially received within the open pocket.

In some aspects, the techniques described herein relate to any of the described systems, and further including wherein the first track structure and the second track structure are positioned within the vehicle cargo area that has at least one end associated with a moveable vehicle panel that moves between an open position and a closed position, and wherein the one or more receptacles have an outer surface that faces an inner surface of the moveable vehicle panel when the moveable vehicle panel is in the closed position.

In some aspects, the techniques described herein relate to any of the described systems, and further including wherein movement of the one or more receptacles between the open position and the closed position is solely responsive to movement of the moveable vehicle panel between the open position and the closed position.

In some aspects, the techniques described herein relate to any of the described systems, and further including at least one piece of protective material extending outwardly of the outer surface of the one or more receptacles that is engageable with the moveable vehicle panel when in the closed position.

A vehicle according to an exemplary aspect of the present disclosure includes, among other things: a cargo area defined between a front wall and pair of side walls extending from the front wall to a distal end of the cargo area; a tailgate associated with the distal end of the cargo area, wherein the tailgate is moveable between an open position and a closed position in which the tailgate forms a rear wall of the cargo area; a first track structure extending along one side wall of the pair of side walls of the cargo area; a second track structure extending along another side wall of the pair of side walls of the cargo area, wherein each of the first track structure and the second track structure extend to a distal end that faces the tailgate when the tailgate is in the closed position; at least one base plate supported for sliding movement by the first track structure and the second track structure; one or more first receptacles associated with the distal end of the first track structure; and one or more second receptacles associated with the distal end of the second track structure, wherein the one or more first receptacles and the one or more second receptacles are moveable between an open position and a closed position.

In some aspects, the techniques described herein relate to any of the described vehicles, and further including wherein movement of the one or more first receptacles and the one or more second receptacles between the open position and the closed position is responsive to movement of the tailgate between the open position and the closed position, and wherein access to the one or more first receptacles and the one or more second receptacles is prevented by moving the tailgate to the closed position.

In some aspects, the techniques described herein relate to any of the described vehicles, and further including wherein: each distal end comprises an open pocket surrounded by one or more pocket walls; the one or more first receptacles and the one or more second receptacles each comprise a base wall with one or more side walls extending outwardly around an outer periphery of the base wall to form an internal cavity having an open end, and including a cover that closes the internal cavity; and the base wall of the one or more first receptacles and the one or more second receptacles are at least partially received within the open pocket with the cover pivoting relative to the base wall between the open position and the closed position.

In some aspects, the techniques described herein relate to any of the described vehicles, and further including at least one piece of protective material extending outwardly of an outer surface of the one or more first receptacles and the one or more second receptacles, wherein the at least one piece of protective material is engageable with an inner surface of the tailgate when the tailgate is in the closed position.

A method according to an exemplary aspect of the present disclosure includes, among other things: providing a track assembly that supports at least one accessory base plate in a vehicle cargo area, wherein the track assembly extends to a distal end that faces a tailgate; and mounting one or more receptacles within the distal end, wherein the one or more receptacles are moveable between an open position and a closed position.

In some aspects, the techniques described herein relate to any of the described methods, and further including controlling movement of the one or more receptacles between the open position and the closed position in response to movement of the tailgate between a gate open position and a gate closed position.

In some aspects, the techniques described herein relate to any of the described methods, and further including wherein access to the one or more receptacles is automatically prevented by moving the tailgate to the closed position.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a track assembly that supports an adjustable base plate used to secure accessories in a vehicle cargo space, and more particularly to one or more storage receptacles or bins that can be incorporated into the track assembly.

There are often situations where it would be useful for a vehicle user to be able to switch between different upfit systems to enable different functional capabilities, or to temporarily remove a base plate or an upfit accessory to allow the module or its contents to be used off the vehicle, then reattach the base plate and/or module once the desired operation or task is completed. Traditional upfit integration of elements into a vehicle by mechanical, bolt-on physical attachment makes it difficult to easily change different types of base plates or accessories for use in different applications. In one example, an adjustable base plate system is provided that has a quick connect/disconnect capability to allow for adjustability of a location of the base plate within the vehicle cargo area.

Figure 1:
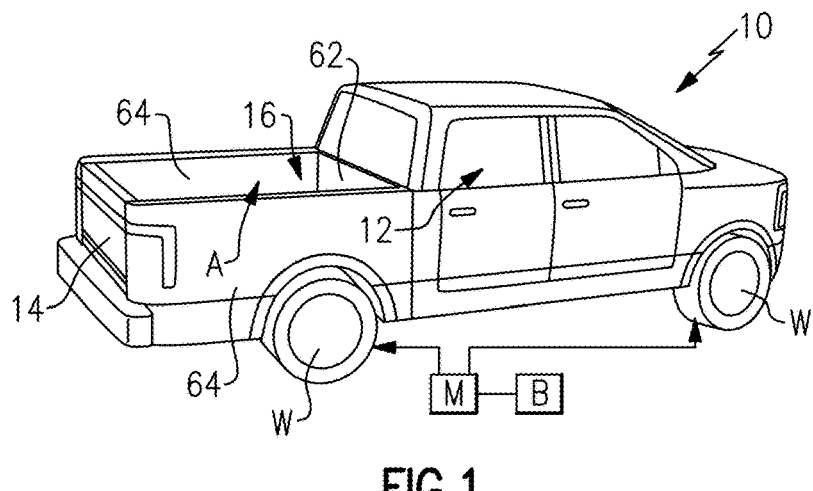
FIG. 1 illustrates a perspective view of a vehicle having a cargo bed that can be equipped with base plates used to secure accessories according to an exemplary aspect of the present disclosure.

FIGS. 1-4 disclose exemplary embodiments of an adjustable base plate system that interfaces with a track structure within a vehicle cargo area. With reference to FIGS. 1 and 2A-2B, a vehicle 10 includes a passenger compartment 12 and moveable vehicle panel such as a tailgate 14, for example, that encloses one end of a cargo bed 16 that is aft of the passenger compartment 12. The cargo bed 16 has a floor/support surface 18 and provides an open cargo area A. In this example, the vehicle 10 is a pickup truck. However, the vehicle 10 could be another type of vehicle in another example, such as a car, van, sport utility vehicle, etc. that has a support surface 18 for a cargo area.

The example vehicle 10 is an electrified vehicle and, in particular, a battery electric vehicle (BEV). In another example, the vehicle 10 could be another type of electrified vehicle, such as a plug-in hybrid electric vehicle (PHEV), or a conventional vehicle.

In particular, the example vehicle 10 includes an electrified powertrain capable of applying a torque from an electric machine M (e.g., an electric motor) to drive a least one set of wheels W. The vehicle 10 can include a traction battery pack B, which powers the electric machine M and, potentially, other electrical loads of the vehicle 10.

Various accessories and/or modules 22 can be secured to the vehicle 10 by engaging one or more of the base plates 20. The accessories/modules 22 can comprise a lockable storage box that holds tools, a refrigerator, etc. The accessory 22 could also be a lidded lockable container that includes a compartment for storing power tools or other items that require power or data connection.

The accessories 22 can engage one or more of the base plates 20 using an attachment system. In the exemplary embodiment, the attachment system includes a plurality of apertures 24 and at least one foot 26 (schematically shown in FIG. 2B) that cooperate to provide a mechanical connection interface. The base plate 20 is supported relative to the vehicle surface 18 of the cargo area A with an additional support interface that is separate from the mechanical connection interface for the accessories 22. In one example, the additional support interface comprises a track assembly.

In one example, the base plates 20 provide the apertures 24 and the accessories 22 include a plurality of feet 26. This could be rearranged, however, such that one or all of the feet 26 extend from the base plates 20 and the accessories 22 provide some or all of the apertures 24.

Figure 2A:
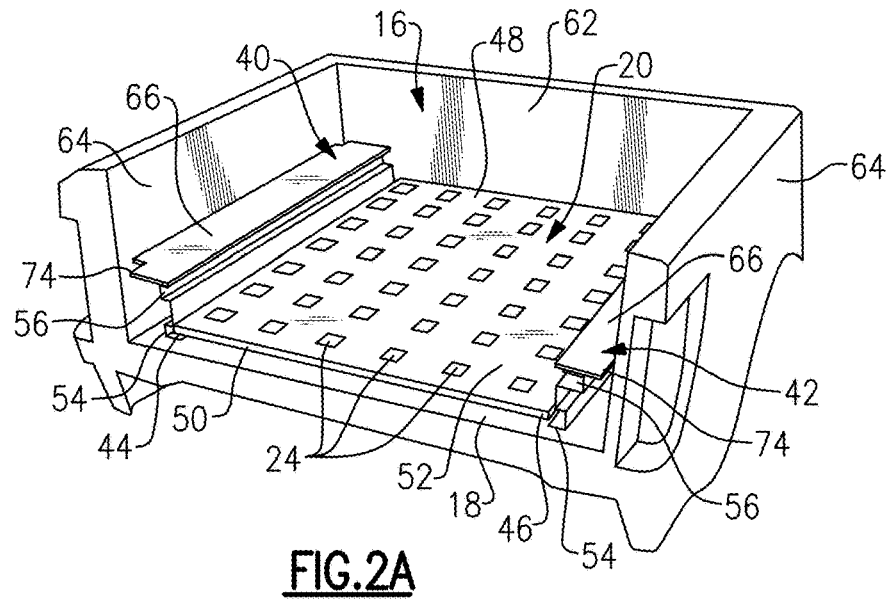
FIG. 2A is a perspective view of an adjustable base plate mounting system for a cargo bed, where the mounting system comprises a track.
Figure 2B:
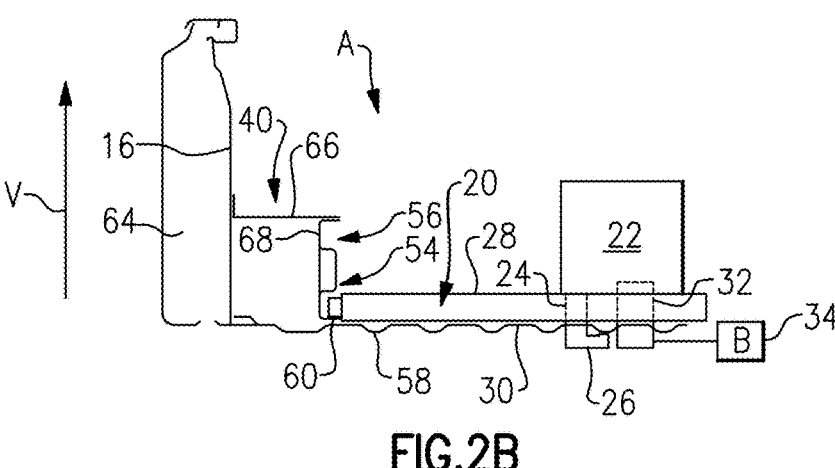
FIG. 2B is a section view of the adjustable base plate mounting system of FIG. 2A.

In the exemplary embodiment, when the base plate 20 and the accessories 22 are engaged, the feet 26 are each received within one of the apertures 24 such that the feet 26 each extend from a first side 28 of the base plate 20, through one of the apertures 24, and past an opposite, second side 30 of the base plate 20 as schematically shown in FIG. 2B.

In one example, the accessory 22 comprises a lockable box that is mechanically coupled to the vehicle 10 through the base plate 20. Optionally, the accessory 22 could additionally comprise a lockable box that includes a power interface 32, as schematically shown in FIG. 2B. This would allow devices within the lockable box to be powered from a vehicle power supply 34 such as the battery pack B, for example.

In the subject disclosure, a track assembly is used to mount one or more base plates 20 within a cargo area A. In one example, the track assembly comprises a first track structure 40 configured to extend along one side of the vehicle cargo area A and a second track structure 42 configured to extend along an opposite side of the vehicle cargo area A. The base plate 20 has a first edge 44 and a second edge 46 opposite of the first edge 44. The first edge 44 is supported by the first track structure 40 and the second edge 46 is supported by the second track structure 42. In one example, the first 44 and second 46 edges extend in a longitudinal direction along a length of the vehicle 10.

As shown in FIG. 2A, the first 44 and second 46 edges are parallel to each other. The base plate 20 also has a third edge 48 and a fourth edge 50 that are parallel and spaced apart from each other. The third 48 and fourth 50 edges connect to the first 44 and second 46 edges such that the base plate 20 comprises a four-sided generally flat and planar mount surface 52 to support the accessories 22.

The subject disclosure provides that the first 40 and second 42 track structures allow the base plate 20 to be mounted at different vertical height levels within the cargo area A. In one example, the first track structure 40 and the second track structure 42 each comprise at least a first tier track 54 and a second tier track 56. In one example, the second tier tracks 56 are spaced apart from respective first tier tracks 54 in a vertical direction V relative to the support surface 18 of the vehicle cargo area A. The base plate 20 can be supported by either the first tier tracks 54 or by the second tier tracks 56 such that a distance between a bottom surface 58 of the base plate 20 and the support surface 18 of the vehicle cargo area can be adjusted to increase available cargo area beneath the base plate 20 as needed.

In FIGS. 2A-B a two-tier track is shown; however, additional tiers could be added as needed such that the distances between the bottom surface 58 of the base plate 20 and the support surface 18 of the vehicle cargo area A can be further varied. Optionally, two or more base plates 20 could be installed at the same time to provide support for a plurality of accessories 22, or to provide a support for accessories 22 within the cargo bed 16 in combination with a cover for the cargo bed 16.

In one example, the edges 44, 46 of the base plate 20 include low-friction members that allow the base plate 20 to be easily moved along the first 54 and second 56 tier tracks such that the base plate 20 can be switched between the two different height levels. In one example, a first set of sliders or bearings 60 are positioned on the first edge 44 of the base plate 20 and a second set of sliders or bearings 60 are positioned on the second edge 46 of the base plate 20. The first 64 and second 66 sets of bearings are respectively spaced apart from each other in a longitudinal direction along the first 44 and second 46 edges of the base plate 20.

In one example, the first track structure 40 and the second track structure 42 are steel formed structures that are mounted to sides of the cargo bed 16 and/or to outermost edge portions of the support surface 18. In the example of a truck as shown in FIG. 1, the cargo bed 16 is defined by a forward wall 62 near a passenger compartment 12 and a pair of side walls 64 extending from the forward wall 62 toward a rear of the vehicle. The tailgate 14 is associated with a distal end of the cargo bed 16, wherein the tailgate 14 is moveable between an open position and a closed position in which the tailgate 14 forms a rear wall of the cargo bed 16 to enclose the cargo area A.

Figures 3, 4, 8, 9:
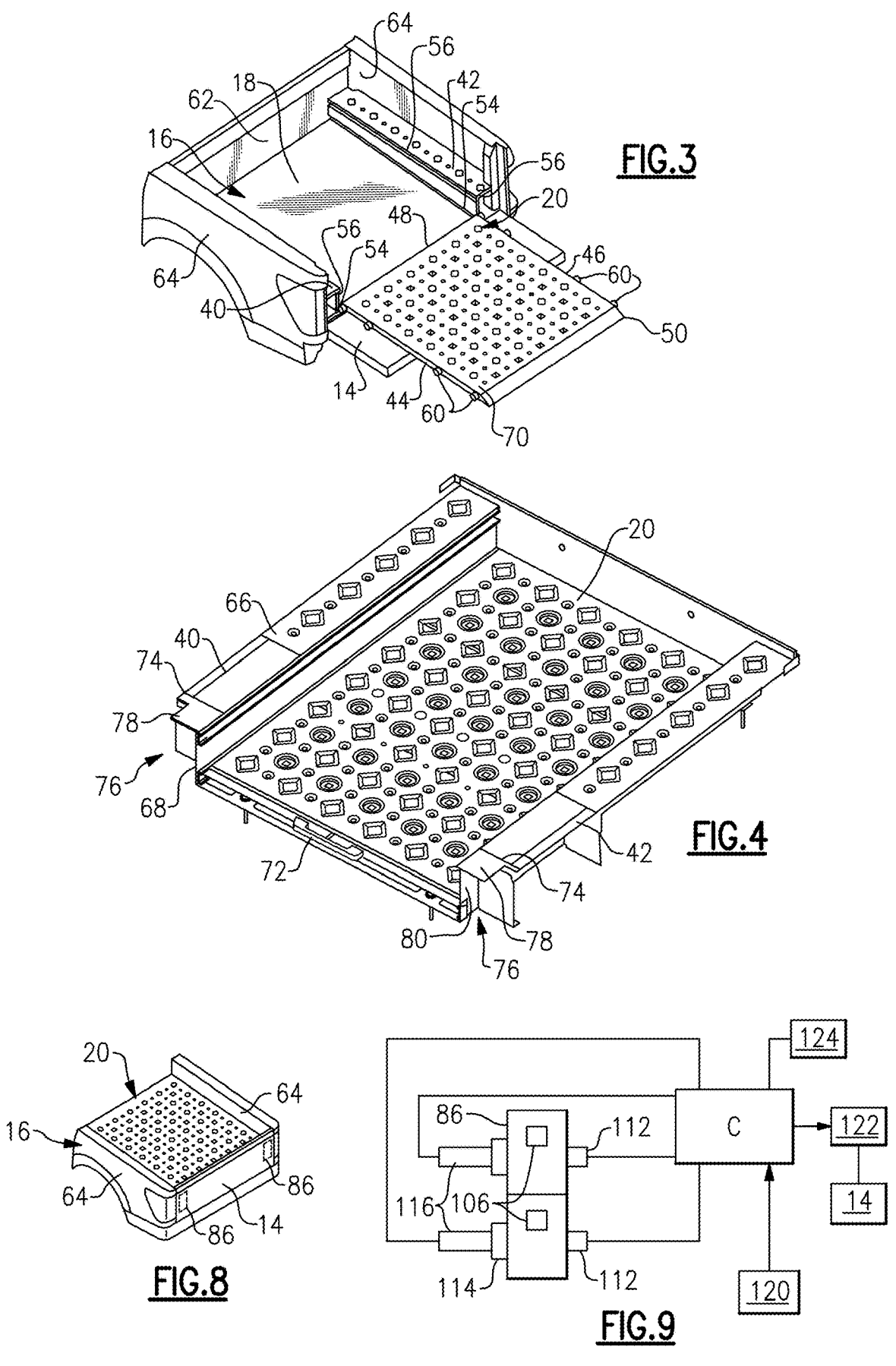
FIG. 3 is a perspective view of an adjustable base plate mounting system with the baseplate in a fully extended position.
FIG. 4 is a perspective top view of the adjustable base plate mounting system showing open pocket areas in a distal end of a track assembly.
FIG. 8 is a perspective view showing a tailgate in a closed position to lock storage bins within the cargo area.
FIG. 9 is a schematic illustration of a control system that may be used with the receptacles.
Figure 5:
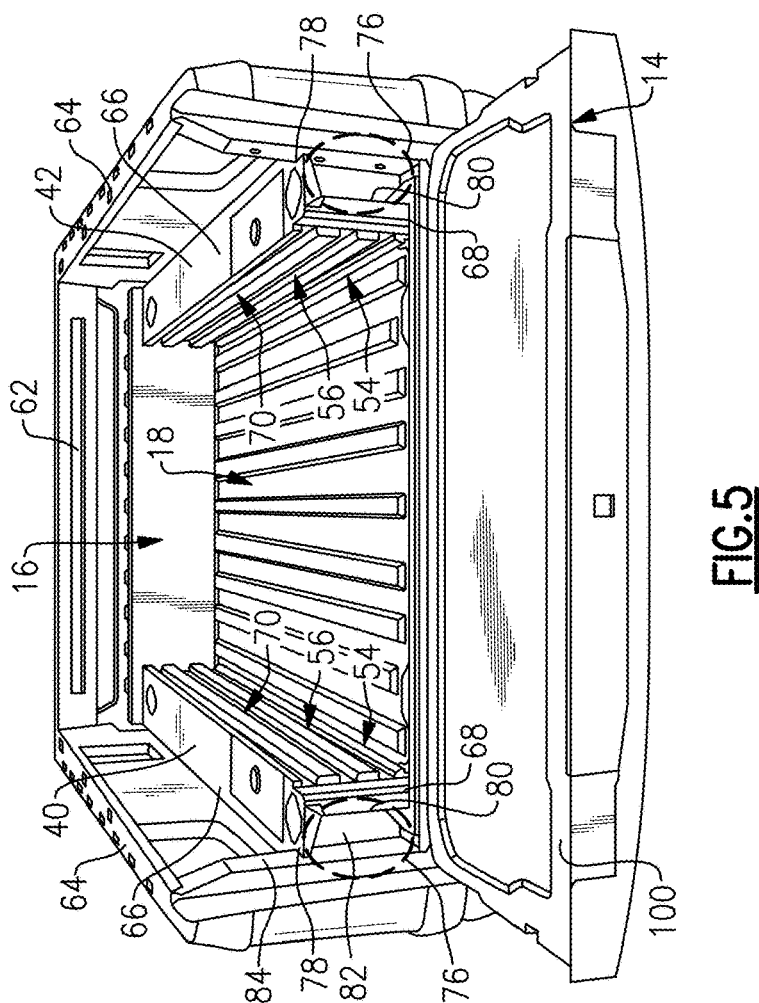
FIG. 5 is an end view of open pocket areas in distal ends of tracks from the adjustable base plate mounting system.

In one example, the first 40 and second 42 track structures each have an upper surface 66 that extends along a length of the side wall 64, and a side wall support 68 that provides structural support for the first 54 and second 56 tier tracks as shown in FIG. 5. The configuration in FIG. 5 also shows a configuration that includes a third tier track 70 that could be used for a base plate or tonneau cover. The bearings 60 are configured to slide along the track structures between a fully installed position as shown in FIG. 2A and a removed position as shown in FIG. 3. Once the base plate is in the removed position, the base plate can be moved from the lower tier track 54 to the second tier track 56. Optionally, the base plate 20 can be completely removed from the cargo area A as needed. In one example shown in FIG. 4, a handle 72 can be used to facilitate movement of the base plate 20 along the track structures. Additional features regarding the subject adjustable base plate system can be found in application Ser. No. 17/886,663, which was filed on Aug. 12, 2022, which is assigned to the assignee of the subject application, and which is herein incorporated by reference in its entirety.

In one example shown in FIG. 4, each of the first track structure 40 and the second track structure 42 extend to a distal end 74 that provides an open pocket area 76 that is defined by one or more walls. In one example, the open pocket area 76 includes a top wall 78, at least one side wall 80, and a rear wall 82. The top wall 78 may be part of, or may extend from, the upper surface 66 of the track structures 40, 42. In one example, the side wall 80 is spaced from an inner surface 84 of the cargo bed side wall 64 as shown in FIG. 5. Thus, in this example, the open pocket area 76 is defined by the top wall 78, the rear wall 82, the inner surface 84 of the cargo bed side wall 64, and the side wall 80 such that the pocket area 76 has an open end when the tailgate 14 is in the open position.

Figure 6:
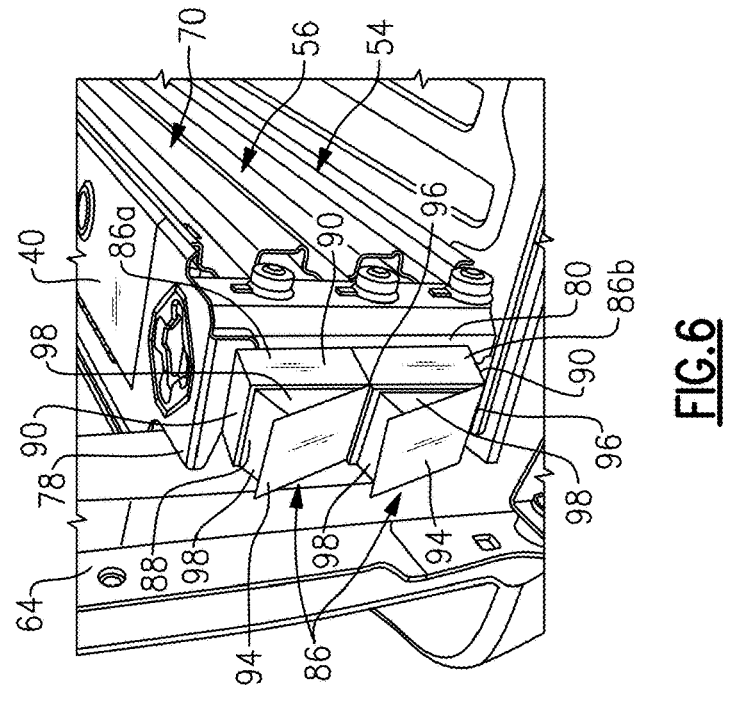
FIG. 6 is a perspective view of receptacles mounted within one of the open pocket areas of FIG. 5.

The subject disclosure provides for a receptacle configuration that is uniquely shaped to fit in the end of the base plate slide track structure. In one example, one or more receptacles 86, such as storage boxes or storage bins for example, are at least partially received within the open pocket area 76 as shown in FIG. 6. Each receptacle 86 is moveable between an open position and a closed position. In one example, the one or more receptacles 86 comprise a plurality of receptacles 86, where there is at least one receptacle 86 mounted in each distal end 74 of the first track structure 40 and the second track structure 42 as schematically shown in FIG. 8. FIG. 6 shows an example where at least two receptacles 86 are mounted in each distal end 74. In this example, a first receptacle 86a is positioned vertically above a second receptacle 86b in a stacked relationship. Additional receptacles 86 could also be added as needed dependent on an amount of available packaging space defined in the open pocket area 76 and a desired size of receptacle 86.

In one example, each receptacle 86 comprises a base wall 88 with one or more side walls/end walls 90 extending outwardly around an outer periphery of the base wall 88 to form an internal cavity 92 having an open end, and a cover 94 may be provided to close the internal cavity 92. The cover 94 may be pivotal between the open position and the closed position.

In one example, the cover 94 has one end 96 mounted for pivoting movement relative to the receptacle 86. Any type of pivoting connection interface can be used to allow for this pivoting movement, e.g., mechanical hinge, living hinge, pivot shaft, etc. In one example, the cover 94 may have side walls 98 that move with the cover 94 during pivoting movement, such that the side walls nest inside of or outside of the side walls 90 of the receptacle 86. In the example shown in FIG. 6, when the cover 94 is in a fully open position, a planar surface defined by the cover 94 extends at an angle relative to the base wall 88 of the receptacle 86, e.g., the cover 94 is non-parallel with the base wall 88 when in the open position.

The distal end 74 of the first track structure 40 and the second track structure 42 face an inner surface 100 of a movable vehicle panel, such as the tailgate 14, when the tailgate 14 is in the closed position. In one example, the cover 94 pivots to the open position in response to the tailgate 14 moving to an open position. The cover 94 may pivot to the open position automatically and/or solely in response to the tailgate 14 being moved to the open position. Optionally, the receptacle 86 may be placed against a resilient mechanism 106 (FIG. 9), such as a spring-loaded button or toggle for example, that will force the receptacle 86 to deploy/open when desired.

In one example, the cover 94 automatically pivots to the closed position in response to the tailgate 14 moving to the closed position. As such, access to any items in the receptacles 86 is prevented by simply moving the tailgate 14 to the closed position (see FIG. 8). This is simple and efficient way to provide a locked storage bin or box in a vehicle without requiring a separate lock component.

In one example, the receptacles 86 are made from a relatively thin plastic material. In one example, the plastic material can be molded with long persistence phosphor to enable the receptacles 86 to self-illuminate.

Figure 7:
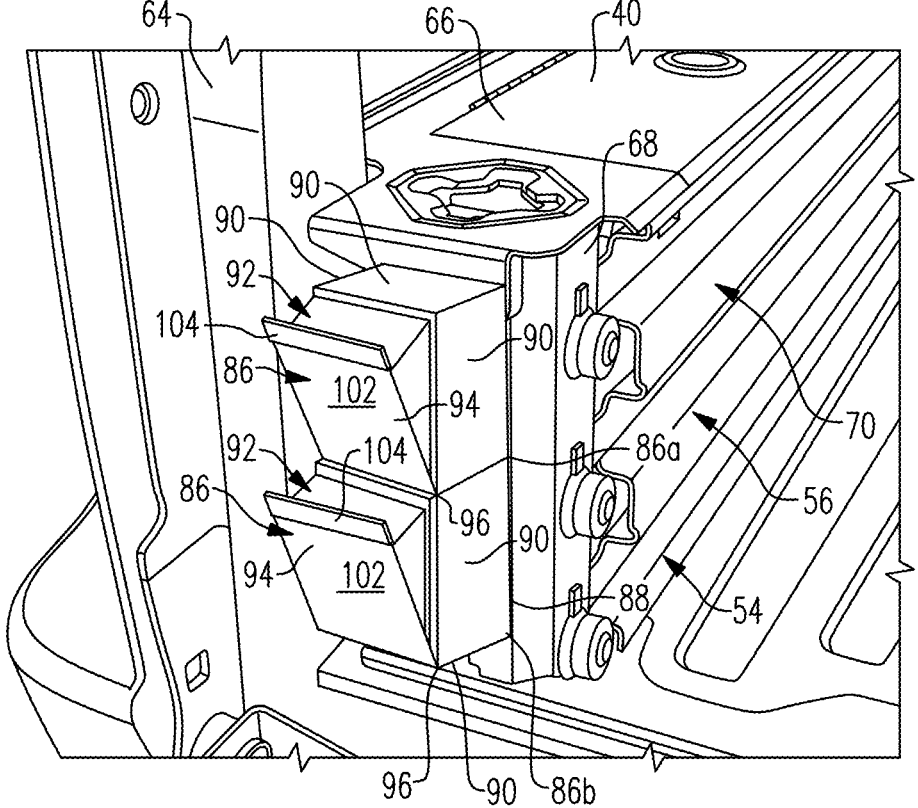
FIG. 7 is a view similar to FIG. 6 but showing a protective piece of material associated with the receptacles.

The receptacles 86 have an outer surface 102 that faces an inner surface 100 (FIG. 7) of the tailgate 14 when the tailgate 14 is in the closed position. In one example, at least one piece of protective material 104 extends outwardly of the outer surface 102 of the receptacle. The piece of protective material 104 may be engageable with the inner surface 100 of the tailgate 14 when the tailgate 14 is in the closed position. Alternatively, protective material 104 may be placed on the tailgate 14. In one example, the piece of protective material 104 comprises a strip of material that extends along an upper edge of the cover 94. In one example, the piece of protective material 104 can be comprised of a resilient or compressible material, such as foam rubber for example. Using such a piece of protective material 104 will prevent the receptacle 86 from scraping against paint on the inner surface 100 of the tailgate 14, while also providing an interference fit to prevent the receptacle 86 from rattling during vehicle driving events.

In one example, the subject disclosure also provides a method that includes providing a track assembly that supports at least one base plate 20 in a vehicle cargo area A, wherein the track assembly extends to a distal end 74 that faces a tailgate 14, and mounting one or more receptacles 86 within the distal end 74, wherein the one or more receptacles 86 are moveable between an open position and a closed position.

The method may also include controlling movement of the one or more receptacles 86 between the open position and the closed position in response to movement of the tailgate 14 between a gate open position and a gate closed position.

Further, access to the one or more receptacles 86 is automatically prevented by moving the tailgate to the closed position.

FIG. 9 illustrates a control system 110 that may be used with the receptacles 86. In one example, the system can use a sensor 112, such as a position/door ajar switch sensor, that is in communication with one or more controllers C and/or computer processing devices to actively determine if the receptacle 86 is in the closed/open position. In one example, a higher fidelity position sensor is used with a gear based ratcheting feature 114 associated with the track assembly, and which is be coupled to an electrically controlled component 116, such as an electrically actuated solenoid or electric motor, for example, to control the deployment position of the receptacle 86 when it is desired to be opened. A user may specify a specific position the receptacle 86 should be in when the tailgate 14 is opened and this resilient closure mechanism 106 can allow a spring to push the receptacle 86 to the desired position.

In one example, a user can use specific vehicle control systems and a vehicle human machine interface (HMI) to control the synchronization and desired position of the track and receptacle mechanism when the tailgate 14 is opened. Control of a desired position of the receptacle 86 when the tailgate 14 is open can also be based on a geofenced location of the vehicle and certain other characteristics such as a time of day; day of week; who is opening the tailgate 14, etc. as identified via the vehicle sensors.

In one example, the receptacles 86 that are spring loaded to deploy when the tailgate 14 opens automatically can be pushed closed when tailgate 14 is lifted to a closed position.

In one example, the tailgate 14 will not close if a center high-mounted stop lamp (CHMSL) sensor 120, e.g., camera/radar, detects that the base plate 20 is in an extended position. The controllers C may actuate a stop lever/mechanism 122 to prevent the tail gate 14 from closing in response to such a detection. An alarm 124 may also sound if the base plate 20 is extended and the vehicle 10 begins to move.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A system, comprising:
a first track structure configured to extend along one side of a vehicle cargo area;
a second track structure configured to extend along an opposite side of a vehicle cargo area, wherein each of the first track structure and the second track structure extend to a distal end;
at least one base plate having a first edge and a second edge opposite of the first edge, wherein the first edge is supportable by the first track structure and the second edge is supportable by the second track structure;
one or more receptacles mounted within at least one distal end of the first track structure and the second track structure, wherein the one or more receptacles are moveable between an open position and a closed position;
a control system having at least one sensor in communication with one or more controllers to actively determine if the one or more receptacles are in the closed position or the open position.

2. The system of claim 1, wherein the at least one base plate is mounted for sliding movement along the first track structure and the second track structure.

3. The system of claim 1, wherein the one or more receptacles comprise a plurality of receptacles, wherein at least one receptacle is mounted in each distal end of the first track structure and the second track structure.

4. The system of claim 3, wherein the at least one receptacle mounted in each distal end comprises at least two receptacles mounted in each distal end.

5. The system of claim 4, wherein a first receptacle of the at least two receptacles is positioned vertically above a second receptacle of the at least two receptacles.

6. The system of claim 1, wherein the one or more receptacles comprise a base wall with one or more side walls extending outwardly around an outer periphery of the base wall to form an internal cavity having an open end, and including a cover that closes the internal cavity.

7. The system of claim 6, wherein the cover is pivotal between the open position and the closed position.

8. The system of claim 1, wherein the distal end of each of the first track structure and the second track structure comprises an open pocket surrounded by one or more walls, and wherein the one or more receptacles are at least partially received within the open pocket.

9. The system of claim 1, wherein the first track structure and the second track structure are positioned within the vehicle cargo area that has at least one end associated with a moveable vehicle panel that moves between an open position and a closed position, and wherein the one or more receptacles have an outer surface that faces an inner surface of the moveable vehicle panel when the moveable vehicle panel is in the closed position.

10. The system of claim 1, including a movable vehicle panel associated with an end of the vehicle cargo area, wherein:
the movable vehicle panel is moveable between a panel open position and a panel closed position;
the one or more receptacles each have a cover that is moveable between the open position and the closed position; and
movement of the cover between the open position and the closed position is in response to movement of the movable vehicle panel between the panel open position the panel closed position such that the cover moves to the open position in response to the movable vehicle panel moving to the panel open position.

11. The system of claim 1, including a unidirectional locking mechanism associated with at least one of the first track structure and second track structure, the unidirectional locking mechanism coupled to an electrically controlled component to control a deployment position of the one or more receptacles.

12. The system of claim 1, including a resilient closure mechanism configured to position the one or more receptacles to a desired position.

13. A system, comprising:
a first track structure configured to extend along one side of a vehicle cargo area;
a second track structure configured to extend along an opposite side of a vehicle cargo area, wherein each of the first track structure and the second track structure extend to a distal end;
at least one base plate having a first edge and a second edge opposite of the first edge, wherein the first edge is supportable by the first track structure and the second edge is supportable by the second track structure;
one or more receptacles mounted within at least one distal end of the first track structure and the second track structure, wherein the one or more receptacles are moveable between an open position and a closed position;
wherein the one or more receptacles comprise a base wall with one or more side walls extending outwardly around an outer periphery of the base wall to form an internal cavity having an open end;
a cover that closes the internal cavity, wherein the cover is pivotal between the open position and the closed position; and
wherein the distal end of the first track structure and the second track structure face an inner surface of a movable vehicle panel when the movable vehicle panel is in a closed position, and wherein the cover pivots to the open position in response to the movable vehicle panel moving to an open position.

14. The system of claim 13, wherein the cover automatically pivots to the closed position in response to the movable vehicle panel moving to the closed position, and wherein access to the one or more receptacles is prevented by moving the movable vehicle panel to the closed position.

15. A system, comprising:
a first track structure configured to extend along one side of a vehicle cargo area;
a second track structure configured to extend along an opposite side of a vehicle cargo area, wherein each of the first track structure and the second track structure extend to a distal end;
at least one base plate having a first edge and a second edge opposite of the first edge, wherein the first edge is supportable by the first track structure and the second edge is supportable by the second track structure;
one or more receptacles mounted within at least one distal end of the first track structure and the second track structure, wherein the one or more receptacles are moveable between an open position and a closed position;
wherein the first track structure and the second track structure are positioned within the vehicle cargo area that has at least one end associated with a moveable vehicle panel that moves between an open position and a closed position, and wherein the one or more receptacles have an outer surface that faces an inner surface of the moveable vehicle panel when the moveable vehicle panel is in the closed position; and wherein movement of the one or more receptacles between the open position and the closed position is solely responsive to movement of the moveable vehicle panel between the open position and the closed position.

16. A system, comprising:

a first track structure configured to extend along one side of a vehicle cargo area;

a second track structure configured to extend along an opposite side of a vehicle cargo area, wherein each of the first track structure and the second track structure extend to a distal end;

at least one base plate having a first edge and a second edge opposite of the first edge wherein the first edge is supportable by the first track structure and the second edge is supportable by the second track structure;

one or more receptacles mounted within at least one distal end of the first track structure and the second track structure, wherein the one or more receptacles are moveable between an open position and a closed position;

wherein the first track structure and the second track structure are positioned within the vehicle cargo area that has at least one end associated with a moveable vehicle panel that moves between an open position and a closed position, and wherein the one or more receptacles have an outer surface that faces an inner surface of the moveable vehicle panel when the moveable vehicle panel is in the closed position; and at least one piece of protective material extending outwardly of the outer surface of the one or more receptacles that is engageable with the moveable vehicle panel when in the closed position.

17. A vehicle, comprising:

a cargo area defined between a front wall and pair of side walls extending from the front wall to a cargo distal end of the cargo area;

a tailgate associated with the cargo distal end of the cargo area, wherein the tailgate is moveable between a gate open position and a gate closed position in which the tailgate forms a rear wall of the cargo area;

a first track structure extending along one side wall of the pair of side walls of the cargo area;

a second track structure extending along another side wall of the pair of side walls of the cargo area, wherein each of the first track structure and the second track structure extend to a distal end that faces the tailgate when the tailgate is in the gate closed position;

at least one base plate supported for sliding movement by the first track structure and the second track structure;

one or more first receptacles associated with the distal end of the first track structure; and one or more second receptacles associated with the distal end of the second track structure, wherein the one or more first receptacles and the one or more second receptacles each have a cover that is moveable between an open position and a closed position;

wherein movement of the cover between the open position and the closed position is in response to movement of the tailgate between the gate open position the gate closed position such that the cover moves to the open position in response to the tailgate moving to the gate open position.

18. The vehicle of claim 17, wherein movement of the one or more first receptacles and the one or more second receptacles between the open position and the closed position is responsive to movement of the tailgate between the open position and the closed position, and wherein access to the one or more first receptacles and the one or more second receptacles is prevented by moving the tailgate to the closed position.

19. The vehicle of claim 17, wherein:

each distal end comprises an open pocket surrounded by one or more pocket walls;

the one or more first receptacles and the one or more second receptacles each comprise a base wall with one or more side walls extending outwardly around an outer periphery of the base wall to form an internal cavity having an open end, and including a cover that closes the internal cavity; and the base wall of the one or more first receptacles and the one or more second receptacles are at least partially received within the open pocket with the cover pivoting relative to the base wall between the open position and the closed position.

20. A vehicle, comprising:

a cargo area defined between a front wall and pair of side walls extending from the front wall to a cargo distal end of the cargo area;

a tailgate associated with the cargo distal end of the cargo area, wherein the tailgate is moveable between an open position and a closed position in which the tailgate forms a rear wall of the cargo area;

a first track structure extending along one side wall of the pair of side walls of the cargo area;

a second track structure extending along another side wall of the pair of side walls of the cargo area, wherein each of the first track structure and the second track structure extend to a distal end that faces the tailgate when the tailgate is in the closed position;

at least one base plate supported for sliding movement by the first track structure and the second track structure;

one or more first receptacles associated with the distal end of the first track structure;

one or more second receptacles associated with the distal end of the second track structure, wherein the one or more first receptacles and the one or more second receptacles are moveable between an open position and a closed position;

each distal end comprises an open pocket surrounded by one or more pocket walls;

the one or more first receptacles and the one or more second receptacles each comprise a base wall with one or more side walls extending outwardly around an outer periphery of the base wall to form an internal cavity having an open end, and including a cover that closes the internal cavity:

the base wall of the one or more first receptacles and the one or more second receptacles are at least partially received within the open pocket with the cover pivoting relative to the base wall between the open position and the closed position; and at least one piece of protective material extending outwardly of an outer surface of the one or more first receptacles and the one or more second receptacles, wherein the at least one piece of protective material is engageable with an inner surface of the tailgate when the tailgate is in the closed position.

21. A method comprising:

providing a track assembly that supports at least one accessory base plate in a vehicle cargo area, wherein the track assembly extends to a distal end that faces a tailgate;

mounting one or more receptacles within the distal end, wherein the one or more receptacles define an internal cavity with a cover that is moveable between an open position and a closed position; and controlling movement of the cover between the open position and the closed position in response to movement of the tailgate between a gate open position and a gate closed position such that the cover moves to the open position in response to the tailgate moving to the gate open position.

22. The method of claim 21, including pivoting the cover to the open position in response to the tailgate moving to the gate open position and pivoting the cover to the closed position in response to the tailgate moving to the agate closed position.

23. The method of claim 22, wherein access to the one or more receptacles is automatically prevented by moving the tailgate to the closed position.

* * * * *